Patented Dec. 14, 1943

2,336,575

UNITED STATES PATENT OFFICE 2,336,575

PREPARATION OF TERPINEOL

Donald H. Sheffield, Wilmington, Del., assignor to Hercules Powder Company, Wilmington, Del., a corporation of Delaware No Drawing. Application January 22, 1941, Serial No. 375,447

11 Claims. (Cl. 260—631.5)

This invention relates to a method for the dehydration of tert-p-menthadiols. More particularly, it relates to the dehydration of terpins and their hydrates to form terpineols.

The terpins are a by-product in the commercial preparation of turpentine and other terpene cuts and finds relatively limited application in industry. It has long been known that terpin, usually in the form of terpin-hydrate, gave various dehydration products, including the commercially valuable terpineols, upon treatment with such acids as sulphuric acid, phosphoric acid, oxalic acid, sulphonic acids, and the like. However, when one attempts to prepare terpineol from the terpins including terpin-hydrate by dehydration with acids by any of the known methods, it is found that a large proportion of the terpins including terpin-hydrate dehydrates to monocyclic terpene hydrocarbons, such as dipentene, which have a relatively low commercial value. The yield of terpineol has been insufficient to make dehydration economically attractive.

It is an object of this invention to dehydrate terpin or terpin-hydrate to terpineol in as nearly quantitative yields as possible. It is a further object to dehydrate terpin to terpineol while avoiding the formation of terpene hydrocarbons. Other objects will appear hereinafter.

In accordance with this invention, these objects are attained by treating terpin with a solution of one or more of a certain group of oxygenated organic carboxylic acids, the treating solution having a pH controlled within certain rather narrow limits. The terpin is dehydrated to terpineol by this treatment, and the terpineol is recovered from the reaction mixture.

The terpin referred to herein may be in the form of terpin as such, or in the form of terpin-hydrate, or in the form of a water or other solution. The term "terpin" as used herein refers to and includes terpin as such, terpin in the form of terpin-hydrate, and terpin in a solution. In most cases the terpin will be in the form of terpin-hydrate which is considered to be terpin with one molecule of associated water. The term "terpin" will also be understood to include both the 1:4 and the 1:8 types. The term "tert-p-menthadiol" as used herein and in the claims refers to terpin compounds having 2 hydroxyl groups, each being associated with a different tertiary carbon atom. It is further understood that the use of the term "tert-p-menthadiol" refers to and includes terpins as such, terpins in the form of terpin hydrate and terpins in a solution.

The acid which is used in the dehydration method according to this invention will be an oxygenated or oxygen substituted organic carboxylic acid. By this is meant that in addition to the oxygen contained in a first carboxyl group, the acid will carry a substituent group containing oxygen; for example, a hydroxyl group or a ketonic oxygen group, or an additional carboxyl group, etc. Thus, a dicarboxylic acid with no oxygen-containing substituent groups other than the carboxyl groups is considered to have an oxygen-containing substituent group in addition to its first carboxylic group, and thus falls within the class of acids described; whereas a monocarboxylic acid having no substituent groups is not included. The acid utilized will have a dissociation constant of no more than about $1.5 \times 10^{-2}$ determined at a temperature of 25° C. The constant refers to the first hydrogen where more than one hydrogen may ionize. Furthermore, the acid utilized will be one capable of forming a water solution having a pH in the range between about 2 and about 3.5. Thus, it may be seen that the acid utilized will have a dissociation constant sufficiently great and being sufficiently soluble in water to permit the formation of an acid solution having this pH range.

Acids which meet these requirements are, for example, such mono- and polycarboxylic hydroxy aliphatic acids as lactic acid, citric acid, tartaric acid, malic acid, glycolic acid, etc.; such hydroxy aromatic carboxylic acids as salicyclic acid, gallic acid, etc.; and such aliphatic or aromatic polycarboxylic acids as fumaric acid, maleic acid, succinic acid, and the like. Such acids may be utilized in the form of the acid or in the form of the acid anhydride for addition to water.

The dehydration treatment converts the terpin into terpineol with very little formation of terpene hydrocarbons. The terpineol will usually be predominantly alpha-terpineol, but the beta- and gamma- forms will be present to some extent. It will be understood that the term "terpineol" as used herein will include all three forms. The terpineol or mixture of terpineols will be removed from the dehydration reaction mixture by some such means as distillation. It is preferably removed as it is formed by steam distillation, as even under the precisely controlled conditions of the process of the present invention there may be some tendency for the terpineol to become dehydrated upon continued treatment over long periods of time.

The dehydration treatment in accordance with this invention may be conducted at a temperature in the range between about 80° C. and about 140° C. Preferably, the temperature will be maintained between about 90° C. and about 120° C. The optimum temperature will vary somewhat with the exact pH maintained in the reaction mixture, which will lie between about 2.0 and about 3.5. The higher temperatures may be utilized with higher pH values, such as those around 3.2, without undue conversion of terpin to terpene hydrocarbons. Where a relatively lower pH such as about 2.2 is established in the reaction, the lower temperatures of the range given are more desirably used.

The reaction may be conducted at atmospheric pressure or at a reduced or superatmospheric pressure. Usually, the pressure is so adjusted as to maintain the boiling point of the reaction mxture at the temperature at which it is desired to operate. It is preferable to carry out the dehydration under conditions at which the reaction mixture is boiling. The pressure is established to control the boiling point, and this automatically holds the temperature constant.

The dehydration reaction mixture comprises terpin and a water solution of the acid utilized. The quantity of terpin present is not in any way critical, since the dehydration reaction works well with any appreciable quantity of terpin present. However, most efficient operation is obtained when the water solution is substantially saturated with terpin, and it is, therefore, preferable to have present an excess of terpin as such or in the form of terpin-hydrate above the quantity causing complete saturation of the water solution. In this manner as terpin in solution is dehydrated, additional terpin dissolves to maintain a condition of substantial saturation.

The quantity of acid utilized is carefully adjusted with respect to the water present to give a solution having a pH between about 2.0 and about 3.5. By far the best results are obtained when the pH is even more closely adjusted to a value between about 2.2 and about 3.2, as in this range there is a minimum loss of terpin hydrate to terpene hydrocarbons, and at the same time loss of a small amount of water does not change the pH into an inoperable range. It is desirable to check the pH of the reaction mixture frequently where water vapor is removed by distillation or added through dehydration of the terpin. Additions of water will then be made, if necessary, to compensate for water removed and to maintain the pH within the range specified, or additions of acid will be made, if necessary, to compensate for addition of water through dehydration where no water is removed by distillation to maintain the pH within the range specified.

The method in accordance with this invention establishes conditions under which there is a minimum decomposition of terpineol, yet insures dehydration of the terpin. Nevertheless, continued heating of terpineol may cause some dehydration, and it is therefore desirable, although not essential, to remove the terpineol as it is formed.

This is readily accomplished by distilling out the terpineol while the dehydration reaction is taking place. For example, the dehydration reaction may be carried out at a temperature and pressure causing the reaction mixture to boil, thereby giving off a mixture of water vapor and terpineol vapor. A similar result is obtained by blowing steam through the reaction mixture. The terpineol is then recovered from the vapors evolving from the reaction mixture. Conveniently, the entire distillate is condensed and the water and terpineol formed are allowed to separate into two layers. The water may then be permitted to flow back to the reaction mixture in whole or in part to provide reflux and to maintain the water content of the mixture at a quantity in which the pH of the mixture is maintained in the desired range. If the water distilled off is not utilized as reflux, additional water should be added as required to maintain the pH in the proper range.

The method in accordance with this invention may be applied to batches of terpin, or it may be more advantageously carried out as a continuous process. In such a process, terpin will be added from time to time to a properly adjusted acid solution, preferably maintaining an excess of terpin over that required to saturate the acid solution. The terpineol produced is distilled off as it is produced, either with the aid of water vapor formed by adding heat to the reaction mass to boil off water therein or by steam blown into the reaction mixture. As water is usually removed in the form of steam in excess of that formed by dehydration of the terpin, it will usually be necessary to add small amounts of water from time to time to maintain the pH of the reaction mixture at the desired level.

The method in accordance with this invention is illustrated by the specific examples thereof which follow. In these examples all parts and percentages are by weight unless otherwise specified.

*Example I*

A water solution of phthalic acid having a pH of 2.7 was prepared by dissolving 7.5 grams of phthalic anhydride in 3,000 grams of water. Five hundred grams of terpin-hydrate were added to this solution, and the resulting mixture was refluxed at atmospheric pressure for a period of 15 hours. The boiling reaction mixture had a temperature of 99–100° C. during this period. The terpineol was removed as it distilled by condensing the total distillate of water and terpineol vapors, separating the terpineol from the condensate, and returning the water condensed to the reaction system. In this manner 387 grams of anhydrous terpineol were obtained after drying the terpineol condensate. This represents a yield of 99.5% of that theoretically possible. The terpineol recovered had the following analysis.

Specific gravity @ 15.6° C_____ .9392
Refractive index @ 20.0° C_____ 1.4790
Per cent tertiary alcohols based on
 terpineol _____ 100.9

Note: Trace of terpin was present.

Boiling range:
 5% _____° C__ 212.5
 50% _____° C__ 216.8
 90% _____° C__ 220.0
 95% _____° C__ 223.0

*Example II*

A water solution of lactic acid having a pH of 2.7 was prepared by dissolving 15 grams of lactic acid in 3,000 grams of water. Five hundred grams of terpin-hydrate were added to this solution, and the resulting mixture was refluxed for 14 hours at atmospheric pressure. The terpineol formed was continuously collected from the boiling reaction mixture and water condensed returned in the same manner as in Example I. The yield of anhydrous terpineol was 386 grams, which presents 99.2% of the yield theoretically possible. This material had the following analysis:

Specific gravity @ 15.6° C_____ .9377
Refractive index @ 20.0° C_____ 1.4793
Percent tertiary alcohols_____ 101.3
(Terpin traces shown.)
Boiling range:
5% _____° C__ 212.0
50% _____° C__ 216.8
90% _____° C__ 220.0
95% _____° C__ 224.0

*Example III*

A water solution of tartaric acid having a pH of 2.7 was prepared by dissolving 15 grams of tartaric acid in 3,000 grams of water. Five hundred grams of terpin-hydrate were added to this solution, and the resulting mixture was refluxed at atmospheric pressure. Terpineol was recovered from the boiling mixture, and the condensed water returned as in the previous examples. The terpineol recovered had the following analysis:

Specific gravity @ 15.6° C_____ .9340
Refractive index @ 20.0° C_____ 1.4785
Percent tertiary alcohols_____ 98.4
Boiling range:
5% _____° C__ 207.0
50% _____° C__ 216.5
90% _____° C__ 220.5
95% _____° C__ 223.0

*Example IV*

A solution of citric acid having a pH of 2.8 was prepared by dissolving 15 grams of citric acid in 3,000 grams of water. Five hundred grams of terpin-hydrate were added to this mixture, and the resulting system was refluxed at atmospheric pressure. The terpineol formed was recovered, and the water condensed was returned to the system in the same manner as in the previous examples. A yield of 380.5 grams of anhydrous terpineol was obtained. This material had the following analysis:

Specific gravity @ 15.6° C_____ .9358
Refractive index @ 20° C_____ 1.4789
Percent tertiary alcohols_____ 101.7
(Terpin traces shown.)
Boiling range:
5% _____° C__ 208.0
50% _____° C__ 216.5
90% _____° C__ 220.0
95% _____° C__ 221.0

*Example V*

An excess of terpin-hydrate was refluxed under pressure with a lactic acid water solution having a pH of 2.9. The temperature was held at 115° C. by maintaining an elevated pressure corresponding to this boiling point. The vapors evolved from the boiling mixture were condensed and the terpineol therein was separated, the condensed water being returned to the reaction mixture. The terpineol obtained in this manner had a specific gravity of 0.9440 at 15.6° C. and a refractive index of 1.4800 at 20° C.

*Example VI*

An excess of terpin-hydrate was refluxed under pressure with a lactic acid water solution having a pH of 2.4, the pressure being adjusted to maintain the reaction temperature at 115–115° C. Ter-pineol recovered as in the manner of the previous example had a specific gravity of 0.9362 at 15.6° C. and a refractive index of 1.4796 at 20° C.

It will be seen from the results of the preceding examples that the method in accordance with this invention provides a terpineol cut of very high purity. It will be appreciated that a mixture of the various forms of terpineol is usually obtained. It will also be apparent from the results of the examples that the yields of terpineol are for all practical purposes quantitative. Loss of terpin-hydrate to terpene hydrocarbons is eliminated.

It will be understood that the details and examples hereinbefore set forth are illustrative only and that the invention as broadly described and claimed is in no way limited thereby.

What I claim and desire to protect by Letters Patent is:

1. A method of preparing terpineol from a tert-p-menthadiol which comprises heating the tert-p-menthadiol with a solution of a carboxylic acid having an oxygen-containing substituent other than a first carboxyl group selected from the group consisting of hydroxyl and carboxyl substituents and a dissociation constant for the first hydrogen of no more than about $1.5 \times 10^{-2}$ at 25° C. and the constant being sufficiently great and the acid being sufficiently soluble in water to provide a solution thereof having a pH in the range between about 2 and about 3.5, until conversion is substantially complete, and recovering terpineol from the mixture.

2. A method of preparing terpineol from a tert-p-menthadiol which comprises heating the tert-p-menthadiol with a solution of a carboxylic acid having an oxygen-containing substiuent other than a first carboxyl group selected from the group consisting of hydroxyl and carboxyl substituents and a dissociation constant for the first hydrogen of no more than about $1.5 \times 10^{-2}$ at 25° C. and the constant being sufficiently great and the acid being sufficiently soluble in water to provide a solution thereof having a pH in the range between about 2 and about 3.5, at a temperature between about 80° C. and about 140° C., until conversion is substantially complete, and recovering terpineol from the mixture.

3. A method of preparing terpineol from a tert-p-menthadiol which comprises heating the tert-p-menthadiol with a solution of a hydroxy carboxylic acid having a dissociation constant for the first hydrogen of no more than about $1.5 \times 10^{-2}$ at 25° C. and the constant being sufficiently great and the acid being sufficiently soluble in water to provide a solution thereof having a pH in the range between about 2 and about 3.5, until conversion is substantially complete, and recovering terpineol from the mixture.

4. A method of preparing terpineol from a tert-p-menthadiol which comprises heating the tert-p-menthadiol at a temperature between about 80° C. and about 140° C. with a solution of lactic acid having a pH in the range between about 2 and about 3.5, until conversion is substantially complete, and recovering terpineol from the mixture.

5. A method of preparing terpineol from a tert-p-menthadiol which comprises heating the tert-p-menthadiol at a temperature between about 90° C. and about 120° C. with a solution of lactic acid having a pH in the range between about 2.3 and about 3.2, until conversion is substantially complete, and recovering terpineol from the mixture.

6. A method of preparing terpineol from a tertp-menthadiol which comprises heating the tert-p-menthadiol with a solution of a hydroxy polycarboxylic acid having a dissociation constant for the first hydrogen of no more than about $1.5 \times 10^{-2}$ at 25° C. and the constant being sufficiently great and the acid being sufficiently soluble in water to provide a solution thereof having a pH in the range between about 2 and about 3.5, until conversion is substantially complete, and recovering terpineol from the mixture.

7. A method of preparing terpineol from a tert-p-menthadiol which comprises heating the tert-p-menthadiol at a temperature between about 80° C. and about 140° C. with a solution of citric acid having a pH in the range between about 2 and about 3.5, until conversion is substantially complete, and recovering terpineol from the mixture.

8. A method of preparing terpineol from a tert-p-menthadiol which comprises heating the tert-p-menthadiol at a temperature between about 90° C. and about 120° C. with a solution of citric acid having a pH in the range between about 2.3 and about 3.2, until conversion is substantially complete, and recovering terpineol from the mixture.

9. A method of preparing terpineol from a tert-p-menthadiol which comprises heating the tert-p-menthadiol with a solution of a polycarboxylic acid having a dissociation constant for the first hydrogen of no more than about $1.5 \times 10^{-2}$ at 25° C. and the constant being sufficiently great and the acid being sufficiently soluble in water to provide a solution thereof having a pH in the range between about 2 and about 3.5, until conversion is substantially complete, and recovering terpineol from the mixture.

10. A method of preparing terpineol from a tert-p-menthadiol which comprises heating the tert-p-menthadiol at a temperature between about 80° C. and about 140° C. with a solution of phthalic acid having a pH in the range between about 2 and about 3.5, until conversion is substantially complete, and recovering terpineol from the mixture.

11. A method of preparing terpineol from a tert-p-menthadiol which comprises heating the tert-p-menthadiol at a temperature between about 90° C. and about 120° C. with a solution of phthalic acid having a pH in the range between about 2.3 and about 3.2, until conversion is substantially complete, and recovering terpineol from the mixture.

DONALD H. SHEFFIELD.

CERTIFICATE OF CORRECTION.

December 14, 1943.

Patent No. 2,336,575.

DONALD H. SHEFFIELD.

It is hereby certified that error appears in the printed specification of the above numbered patent requiring correction as follows: Page 3, first column, line 75, Example VI, for "115-115° C." read --115-116° C.--; and that the said Letters Patent should be read with this correction therein that the same may conform to the record of the case in the Patent Office.

Signed and sealed this 1st day of February, A. D. 1944.

Henry Van Arsdale,
Acting Commissioner of Patents.

(Seal)